United States Patent [19]

Trapasso

[11] 4,020,123
[45] Apr. 26, 1977

[54] POLYAMINE COATING COMPOSITIONS

[75] Inventor: Louis E. Trapasso, Watchung, N.J.

[73] Assignee: Celanese Corporation, New York, N.Y.

[22] Filed: Dec. 11, 1974

[21] Appl. No.: 531,580

[52] U.S. Cl. .................. 260/837 R; 260/2 EN; 260/37 N; 260/47 EN; 260/59 EP; 260/78 UA; 260/834; 260/836; 260/851; 260/857 R; 260/874; 260/875; 428/458; 428/479
[51] Int. Cl.² ............. C08G 39/10; C08G 45/14
[58] Field of Search .......... 260/836, 837 R, 47 EN, 260/47 EC, 2 EC, 2 EN, 485 N, 78 UA, 834, 851, 875, 857 R; 526/16, 49

[56] References Cited

UNITED STATES PATENTS 3,538,184  11/1970  Heer .................................. 260/830
3,736,289  5/1973  Marshall ........................ 260/837 R

OTHER PUBLICATIONS

Chemical Abstracts, vol. 71, No. 25, 12/1969, p. 125036p.

*Primary Examiner*—Theodore E. Pertilla

[57] ABSTRACT

Thermosetting resin compositions are provided which cure rapidly and exothermically at ambient temperatures. Accelerated crosslinking is accomplished by the reaction of polyisopropenyl ester with amine-containing polymeric compositions.

11 Claims, No Drawings

POLYAMINE COATING COMPOSITIONS

BACKGROUND OF THE INVENTION

It has become increasingly important in resin coating applications that curing of resin systems be accomplished at ambient temperatures and with little or no formation of volatile material.

Resilient seamless flooring is a recent innovation, having been developed during the last decade. A basic seamless floor is composed of a single continuous layer or coat of thermosetting plastic which is firmly bonded to a desired substrate. Seamless chip flooring is a relatively new concept in resilient seamless flooring and involves the on-site encasement of decorative chips in a clear, liquid plastic matrix.

The total number of coats and the thickness of each coat of thermosetting plastic applied to any given substrate depend in part upon the nature of the substrate, the composition of the thermosetting plastic, the method of application, and the properties or characteristics desired in the finished floor. Generally, any resilient seamless floor is comprised of a base coat and optionally one or more finish coats. A seamless chip floor usually consists of a base coat, an optional chip coat, decorative chips, one or more glaze coats, and one or more finish coats.

Because the color and pattern of a seamless floor are determined by the base coat and decorative chips, if used, the glaze and finish coats are clear. Obviously, any discoloration of the base coat resin will alter the color of the floor, especially with lightly colored floors. Discoloration of the glaze and/or finish coats not only will alter the color of the floor, but also will mask the effect of decorative chips, if employed. Thus it is imperative that the resins employed for the base, glaze, and finish coats be free from discoloration from any cause, either before or during curing. Freedom from discoloration also is important when glaze coat resins are applied to walls and other surfaces as protective coatings.

Epoxy resins are among the materials which have been employed successfully as base coats and glaze coats, particularly the epoxy resins based on glycidyl ethers. Such resins, when cured with aliphatic amines, possess an outstanding number of advantages such as excellent adhesion to concrete, plywood, brick, ceramic tile, and plastic tile, resistance to bleedthrough, moisture resistance, low odor, flexibility (resilience), and low temperature curability.

Although listed above as an advantage of glycidyl ethers cured with aliphatic amines, low temperature curability in reality is a requirement of any resin intended for use in seamless flooring. This requirement stems from the rather obvious fact that it is wholly impractical to heat the resin once applied to the substrate. Thus any applied resin must cure at ambient temperature, which may be as low as about 40° F.

In general, glycidyl ethers may be cured at ambient temperature by aliphatic amines. The lower the ambient temperature, however, the longer is the time required to cure the resin. It therefore is desirable to utilize an accelerator to keep cure times within reasonable limits.

Various classes of compounds are known to be accelerators for aliphatic amine/glycidyl ether systems. All however, suffer disadvantages. For example, as a consequence of very pronounced temperature dependence, aliphatic and aromatic organic acids and aliphatic tertiary amines result in a short working life (pot life) and a very long film cure time. Aliphatic and aromatic mercaptans impart excessive and usually intolerable odor to the resin system. And sulfonamides and phenols discolor the resin system. The discoloration by phenols, the most commonly used accelerator class, is most pronounced with phenol itself, with less color being developed with such substituted phenols as nonylphenol. Hence, there is a need for novel accelerators and crosslinking agents for amine-curable epoxy resins.

Other resin coating systems which are of interest and which are being actively investigated are low viscosity thermoplastic compositions which are easily sprayed or cast onto substrates and which cure at ambient temperatures to highly crosslinked thermoset coatings substantially without evolution of volatile component. Essentially 100% of the low viscosity resin coating system is incorporated in the resultant thermoset coating.

It is therefore an object of the present invention to provide novel low temperature curable thermoplastic resin compositions which convert to highly crosslinked coating systems substantially without evolution of volatile material.

It is another object of the present invention to provide curable compositions derived from amine-containing resin compositions.

It is still another object of the present invention to provide novel accelerators and crosslinking agents for amine-modified epoxy resins, and for polyamino-polyaryl-polymethylene resins.

DESCRIPTION OF THE INVENTION

One or more objects of the present invention are accomplished by the provision of a polymeric composition curable at ambient temperatures comprising a homogeneous mixture of an amine-containing thermoplastic resin and a polyisopropenyl ester.

By the term "amine-containing thermoplastic resin composition" is meant a composition wherein the polymer molecules contain a plurality of primary and/or secondary amino groups (i.e., those containing aminohydrogen atoms).

The polyisopropenyl ester preferably is selected from polyester derivatives containing between 2 and about 5 isopropenyl ester groups. A suitable polyisopropenyl ester is exemplified by diisopropenyl malonate.

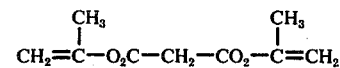

Other polyisopropenyl esters which can be employed are isopropenyl esters of polycarboxylic acids such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid, and the like.

It has been found that polyisopropenyl esters react rapidly and exothermically with primary and secondary amino groups with the formation of amide crosslinkages between amine-containing polymeric chains.

The proportion of polyisopropenyl ester incorporated into an amine-containing thermoplastic resin composition primarily is a function of the curing performance desired. It is apparent that the greater the number of amino groups present, and the greater the quantity of polyisopropenyl ester incorporated into the resin composition, the more crosslinked and thermoset is the final cured coating or film. Generally, a quantity of polyisopropenyl ester is employed to provide between about 0.2 and 1 isopropenyl ester groups per amino-hydrogen moiety present in the resin composition. The desired properties of the cured resin composition as affected by the degree of crosslinking is a factor to be considered in determining the quantity of isopropenyl ester incorporated.

Other materials can be included in the curable resin compositions, such as asbestos, aluminum oxide, pigments, dyes, plasticizers, reactive diluents, and the like. Although not preferred, solvents such as aromatic hydrocarbons, ketones, alcohols, ethers, halocarbons, and the like, may be employed.

Among the curable compositions provided by the practice of the present invention are mixtures of polyisopropenyl ester and amine-modified thermoplastic epoxy resins. The preferred amine-modified thermoplastic epoxy resins are blends of glycidyl ethers and aliphatic amines.

Useful glycidyl ethers include glycidyl ethers of polyhydric phenols obtained by reacting a polyhydric phenol in an excess of epichlorohydrin with sodium hydroxide. Such polyhydric phenols include bisphenol A (2,2-bis 4-hydroxyphenyl-propane), resorcinol, hydroquinone, 4,4-dihydroxybenzophenone, 1,2-bis(4-hydroxyphenol)ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting from 1. up to about 2 moles of epichlorohydrin with 1 mole of dihydric phenol or by reacting diepoxides with additional dihydric phenol.

Still other glycidyl ethers are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these glycidyl ethers are glycerine, ethylene glycol, propylene glycol, polypropylene glycol, diethylene glycol, hexanetriol, pentaerythritol, trimethylolethane, trimethylol propane and trimethylolbutane.

The aliphatic amines useful in blending with glycidyl ethers are those which contain at least two amine nitrogen atoms and more than two active hydrogen atoms per molecule. Examples of such amines includes, among others, the alkylene polyamines, such as ethylenediamine, diethylenetriamine, triethylenetetramine, tetraethylenepentamine, iminobispropylamine, methyliminobispropylamine, hexamethylenediamine, poly(oxypropylene) diamine, and the like. Also included among the aliphatic amines are cyanoethylated and hydroxyalkylated aliphatic amines which can be prepared by reacting ammonia or such amines as the alkylene polyamines with acrylonitrile and monoepoxides, respectively; examples of suitable monoepoxides include ethylene oxide, propylene oxide, and monoglycidyl ethers and esters. Amine adducts formed by reacting epoxy resins with an excess of an aliphatic polyamine also are useful in the present invention.

This invention also contemplates the incorporation of polyisopropenyl ester into thermoplastic composition comprising aminoplast resins, or aminoplast resins blended with epoxy resins. For example, a polyisopropenyl ester is incorporated into a thermoplastic resin blend of a low molecular weight epoxy resin and aminoplast resin in combination with a polycarboxylic acid. The components can be dissolved in a solvent, and then sprayed or cast on a substrate. Polymerization and curing occurs after formation of the film. The reactions which transform the thermoplastic film into a thermoset coating are (1) The reaction of a carboxylic acid group and an epoxide group with the formation of an ester group and a hydroxyl group, (2) the reaction of hydroxyl group and aminoplast resin, and (3) the reaction of isopropenyl ester groups and amino-hydrogen groups resulting in a crosslinked structure.

The aminoplast condensates to be employed in this embodiment are urea-aldehyde and triazine-aldehyde resins and alcohol modified derivatives thereof, that is, alkylated amino resins wherein the alkyl radical contains from 1 to 8 carbon atoms. Such aminoplast resins are the reaction products of aldehydes, for instance formaldehyde, acetaldehyde and the like, with urea, substituted ureas, thioureas, ethylene urea, dicyandiamide, melamine, benzoguanamine, acetoguanamine and the like. The resulting methylol substituted products are etherified with alcohols, for example isopropanol, butanol and 2-ethylhexanol, in order to obtain stability and organic solubility. Such organic soluble aminoplast resins are contemplated for use in this invention.

A particularly interesting aspect of the present invention is the polyisopropenyl ester crosslinking of thermoplastic resins which have a large number of recurring amino groups in the backbone of polymer chains. One such thermoplastic resin, for example, is polyethyleneimine. This resin is prepared by polymerizing ethyleneimine in the presence of various cationic catalysts. Both linear and branched structures can be produced. Polyethylenimine can also be obtained by hydrolysis of the polymerization product of 2-methyl-2-oxazaline, or by hydrolysis of poly(N-ethyleneimine) as described in U.S. Pat. No. 3,821,125.

A traditional method for producing linear polyethylene polyamines is to react ethylene dichloride with ammonia or to react an alkyl halide with an amine at elevated temperatures and pressures (See U.S. Pat. Nos. 3,200,088; 3,372,129; 3,751,474; and the references cited therein).

In another method of producing linear polyethylene polyamines (U.S. Pat. No. 3,714,259) an ethylene compound represented by the formula:

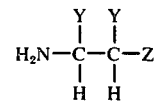

is reacted with an ethanolamine compound represented by the following formula:

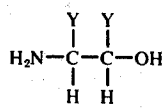

wherein y is hydrogen or CH₃, Z is NH₂ or

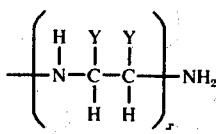

and x is an integer from 1 to 4.

Exemplary ethyleneamine compounds are ethylenediamine, diethylenetriamine, triethylenetetramine, tetraethylenepentamine, pentaethylenehexamine, and compounds including methyl substituents thereof such as 1-methyl-ethylenediamine, and the like. Exemplary ethanolamine compounds include ethanolamine, 1-methyl-ethanolamine, 1,2-dimethylethanolamine, and the like.

In another method of producing resinous polyamines (U.S. Pat. No. 3,184,502) an aliphatic or polymeric polyisocyanate is reacted with an amino sulfonic acid, and thereafter the resulting urea groups are split hydrolytically to form polyamine containing primary amine groups.

Other polyamines suitable for the practice of the present invention are described in U.S. Pat. No. 3,565,941. These include linear and branched polyalkylene polyamines of the general formula:

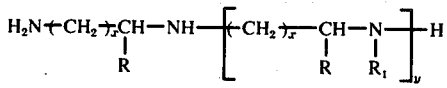

wherein y is an integer of 1–1300 or more, the upper limit being bound only by the solubility limit of the polyamine salt, x is the integer 1 or 2, R is hydrogen or alkyl of 1–2 carbon atoms and $R_1$ is hydrogen or

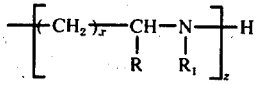

wherein z is 0–200 or more, such as diethylenetriamine, triethylenetetramine and so on to polyethyleneimine and polypropyleneimine of molecular weight to 80,000 and above.

Another important category of thermplastic resins which are applicable in the practice of the present invention are those which contain recurring anhydride groups. Such resins are first treated with an aliphatic polyamine to append a plurality of amine groups to the polymer molecules by reaction of an amine group with an anhydride group. For example, hexamethylenediamine would react to form an amide linkage with one of its amine groups, while the other amine group would remain unreacted for a period of time. Polyisopropenyl ester is blended with the amine-modified thermoplastic resin, and rapid crosslinking occurs by reaction of the isopropenyl ester groups and the pendant amino groups.

The polyanhydride resins which can be amine-modified are any of the thermoplastic resins which are produced by copolymerization of olefinically unsaturated monomers with olefinically unsaturated anhydrides. For example, resins produced by copolymerization of a monomer such as ethylene, propylene, butadiene, acrylonitrile, ethyl acrylate, vinyl chloride, styrene, vinyl ether, vinyl acetate, cyclopentadiene, cyclohexene and vinylcyclohexene with an anhydride (or its corresponding carboxylic acid derivative) such as maleic anhydride, itaconic anhydride and tetrahydrophthalic anhydride.

Another important category of polyamines which are adapted for crosslinking in accordance with the present invention are the polyamino-polyaryl-polymethylene type obtained by condensing aromatic amines with aldehydes or aldehyde precursors. These polyamines are prepared by condensing an aromatic amine with aldehyde in a molar ratio of from about 15:1 to about 2:4, employing a quantity of an acidic catalyst corresponding to a molar ratio of amine to catalyst of from about 10:1 to about 1:1, and subsequently working up the reaction mixture under alkaline conditions, wherein of a portion of the initially prepared amine/catalyst mixture is cooled to a temperature below about 40° C., is allowed to react with the aldehyde while cooling in a reactor in which a temperature of about 60° C. is not exceeded, and is thereafter introduced into a reactor heated to at least about 75° C. into which the uncooled portion of the amine/catalyst mixture is simultaneously introduced.

For the purpose of providing a protective coating on a surface, a polyisopropenyl ester (e.g., diisopropenyl malonate) is blended with a polyamine (e.g., an amine-modified thermoplastic epoxy resin) and cast on the surface as a uniform coherent film. The crosslinking reaction between isopropenyl ester groups and amino groups is immediate and exothermic. In many cases a tough flexible coating is formed within minutes after the curable composition is cast on the surface. If high viscosity is a problem, a minimal quantity of solvent is employed to dilute the curable composition before the casting procedure. The use of solvent is avoided if it is desirable to achieve a nonpolluting, essentially 100% solids coating system.

The following examples are further illustrative of the present invention. The reactants and other specific ingredients are presented as being typical, and various modifications can be devised in view of the foregoing disclosure within the scope of the invention.

EXAMPLE 1

Diisopropenyl Sebacate

Sebacic acid (202 grams, 1 mole), is isopropenyl acetate (1.1 liter, 11 moles), mercuric acetate (10 grams, 0.03 mole), and boron trifluoride etherate (4.6 ml.) are mixed at 15° C. After 2 hours at 25° C., the mixture is treated with 4.1 ml. of triethylamine and concentrated in vacuo at 30° C. The residue is diluted with pentane and filtered through Fluorisil.

The pentane is removed, and the residue is distilled in a falling-film molecular still and diisopropenyl sebacate is recovered.

EXAMPLE 2

Diisopropenyl Azelate

Azelaic acid (100 grams, 0.53 mole), methylene chloride (500 ml.) and mercuric acetate (18.2 grams, 0.057 mole) are treated with 1 ml. of boron trifluoride etherate, and propyne gas is bubbled through the mixture for 3 hours. Solid sodium bicarbonate (5 grams) is added, and the mixture is filtered free of solids and metallic mercury.

The product, diisopropenyl azelate, is recovered by molecular distillation and spinning band column distillation.

EXAMPLE 3

Diisopropenyl Adipate

To a 1-liter three-neck flask (equipped with stirrer, thermometer and reflux condenser protected with a drying tube) are added isopropenyl acetate (400 grams, 4 moles), adipic acid (146 grams, 1 mole), and mercuric acetate (4 grams). The mixture is stirred at 90°–95° C. for approximately 40 hours.

The product mixture is washed with sodium carbonate solution, then filtered. The filtrate is distilled in vacuo. The fore-run is discarded and the remaining distillate is recovered as product.

EXAMPLE 4

Diisopropenyl $C_{36}$-dimer Acid Ester

In a procedure similar to Example 3, EMPOL 1010 (Emery Industries) is esterified with a stoichiometric excess of isopropenyl acetate.

The product is washed neutral with sodium carbonate solution, and purified by molecular distillation.

EXAMPLE 5

Triisopropenyl $C_{54}$-trimer Acid Ester

In a procedure similar to Example 3, EMPOL 1040 (Emery Industries) is esterified with a stoichiometric excess of isopropenyl acetate.

The product is washed neutral with sodium carbonate solution, and purified by molecular distillation.

Benzenetetracarboxylic acid and other polycarboxylic acids are likewise converted into isopropenyl esters by ester exchange reaction with isopropenyl acetate. Polyacrylic acid and other similar polyacids are also suitable for conversion into isopropenyl esters.

EXAMPLE 6

Polyisopropenyl Ester Crosslinking Of An Amine-modified Epoxy Resin

One hundred grams of EPI-REZ 510, the diglycidyl ether of Bisphenol A having an epoxide equivalent weight of 180–200 (Celanese Coatings Company, Louisville, Ky.) and 26 grams of Jeffamine D-230 are blended to form a homogeneous mixture, and heated, at a temperature of 60° C for 1 hour.

Five grams of diisopropenyl adipate is incorporated into the resin blend, and a 100 mil film is cast on a wood substrate. Within 30 minutes the film is cured to a hard glossy coating having properties characteristic of thermoset epoxy resins.

EXAMPLE 7

Polyisopropenyl Ester Crosslinking Of Polyethyleneimine

Twelve grams of polyethyleneimine (M.W. 1200), 1.0 gram of diisopropenyl phthalate, and 5 ml. of benzene are mixed together, and within seconds the mixture is cast on a steel substrate. In less than 5 minutes, the coating is firm and glossy.

The procedure was repeated employing 24 grams of polyethyleneimine and 2.0 grams of diisopropenyl sebacate. When the mixture is cast on a steel substrate, a glossy flexible coating is obtained within several minutes at ambient temperature.

EXAMPLE 8

Polyisopropenyl Ester Crosslinking of Polyamine Of Polyamino-polyaryl-polymethylene Type In a procedure similar to that described in U.S. Pat. No. 3,825,598, a polyamine condensate is prepared by reaction of aniline with 30% aqueous formalin in the presence of 30% aqueous hydrochloric acid catalyst.

In a similar manner, a polyamine condensate is produced by reaction of p-chloroaniline with acetaldehyde.

One hundred grams of aniline/formaldehyde condensate and 10 grams of polyisopropenyl benzenetetracarboxylate are mixed with 75 ml. of methylene chloride. A second solution is prepared with p-chloroaniline/acetaldehyde as the polyamine condensate.

Coatings are cast on steel substrates, and within 30 minutes glossy films are formed at ambient temperature. Drying the coated steel substrates in an oven at 60° C. overnight converts the films into strongly adherent, thermoset resinous coatings.

EXAMPLE 9

Production of A Flexible Epoxy Coating

Fifty grams of EPI-REZ 510 and 15 grams of Jeffamine D-230 are blended to form a homogeneous mixture, and heated at a temperature of 60° C. for 1 hour.

Four grams of diisopropenyl $C_{36}$-dimer ester and 10 ml. of benzene are incorporated into the resin blend, and a 100 mil film is cast on a wood substrate. Within 2 hours the film is cured to a glossy flexible coating having properties characteristic of thermoset epoxy resins.

What is claimed is:

1. A coating composition curable at ambient temperatures comprising a mixture of thermoplastic resin containing a plurality of groups selected from primary and secondary amino groups, and an organic polyester derivative which contains between 2 and about 5 isopropenyl ester groups.

2. A process for producing a low temperature curable composition which comprises admixing a thermoplastic resin containing a plurality of groups selected from primary and secondary amino groups together with an organic polyester derivative which contains between 2 and about 5 isopropenyl ester groups, wherein between about 0.2 and 1 isopropenyl ester group is provided per amino-hydrogen.

3. A process in accordance with claim 2 wherein the curable composition is cast as a surface coating.

4. A crosslinked resin composition which is a resultant product of a process in accordance with claim 2.

5. A process in accordance with claim 2 wherein the polyester derivative is diisopropenyl adipate.

6. A process in accordance with claim 2 wherein the polyester derivative is diisopropenyl $C_{36}$-dimer acid ester.

7. A method for protecting a surface with a crosslinked resinous coating which comprises admixing polyethyleneimine polyamine with a polyisopropenyl ester and casting the admixture on said surface.

8. A method in accordance with claim 7 wherein the crosslinking reaction between polyethyleneimine and polyisopropenyl ester occurs at ambient temperatures.

9. A method in accordance with claim 2 wherein the thermoplastic resin is an amine-modified thermoplastic glycidyl ether epoxy resin.

10. A method for protecting a surface with a crosslinked resinous coating which comprises admixing thermoplastic aromatic amine-aldehyde condensate with a polyisopropenyl ester and casting the admixture on said surface.

11. A method for protecting a surface with a crosslinked resinous coating which comprises admixing a thermoplastic amine-modified polyanhydride with a polyisopropenyl ester and casting the admixture on said surface.

* * * * *